No. 732,309. PATENTED JUNE 30, 1903.
J. W. MARSHALL.
CLAMP.
APPLICATION FILED APR. 6, 1903.
NO MODEL.

Witnesses
M. L. Sorder
Geo. E. Tews

Inventor
John W. Marshall
by
Milo B. Stevens & Co.
Attorneys

No. 732,309. Patented June 30, 1903.

UNITED STATES PATENT OFFICE.

JOHN WINSESLAUS MARSHALL, OF BUTTE, MONTANA.

CLAMP.

SPECIFICATION forming part of Letters Patent No. 732,309, dated June 30, 1903.

Application filed April 6, 1903. Serial No. 151,277. (No model.)

*To all whom it may concern:*

Be it known that I, JOHN WINSESLAUS MARSHALL, a citizen of the United States, residing at Butte, in the county of Silverbow and State of Montana, have invented certain new and useful Improvements in Clamps; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to clamps adapted to attach patches to bursted hose; but it is not limited thereto and may be applied to great advantage in the attachment of any kind of pipe-coverings to repair leaks, to press veneer to round columns, posts, or balusters, to couple pipes, and for various other uses unnecessary to specify.

It has for its object to produce an improved clamp adapted for use upon pipe of any size and is so constructed that the clamping strap or cover may be readily detached or attached. This is advantageous in working around pipes in corners or near walls, in which case the main parts of the clamp can be detached from the strap or covering and the latter inserted through a narrow space before the clamp is attached. The construction permits the attachment of any kind of material—such as flexible metal, cloth, or leather—as a strap or covering.

Figure 1:
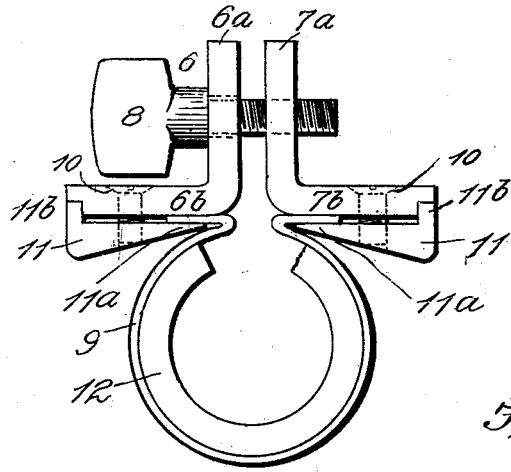
Figure 2:
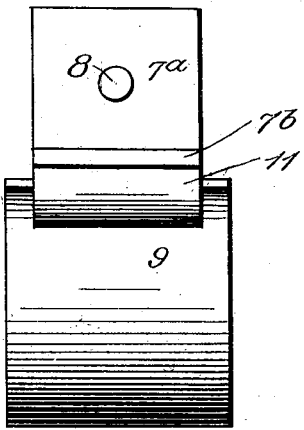
Figure 3:
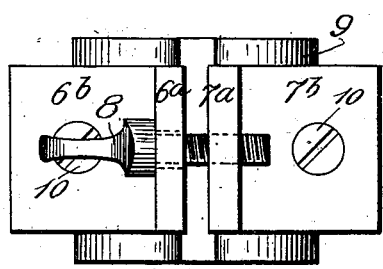

In the accompanying drawings, Figures 1, 2, and 3 are respectively end, side, and top views of the device.

Referring specifically to the drawings, 6 and 7 indicate a pair of clamp members, preferably formed of metal and bent at substantially a right angle, producing flanges $6^a$ and $7^a$, which are faced and adapted to be drawn together by a thumb-screw 8, extending therethrough. This screw is threaded into only one of the flanges and extends loosely through the other, so that the parts may take the necessary inclination consequent on use with pipes of different sizes. The other flanges or parts of the members (indicated at $6^b$ and $7^b$) extend outwardly in opposite directions.

At 9 is indicated the band or strap, which as referred to above may be made of thin flexible metal or flexible fabric of any kind. The ends of this band are clamped by means of screws 10 between the parts $6^b$ and $7^b$ and removable plates, (indicated at 11.) The screws 10 serve to attach the plates to the under side of said parts and also to clamp the ends of the band therebetween. The inner edges of the plates 11 are beveled to a thin edge, as indicated at $11^a$, over which the ends of the band are bent. The outer edges of the plate are turned up, as at $11^b$, to bear against the outer ends of the members $6^b$ and $7^b$, so that they will not turn on the screws 10. At 12 is indicated a rubber covering or packing within the band, particularly useful when hose or water-pipe is patched.

In the use of this device the band being readily separated from the clamp members can be made of any length desired and by attachment of the clamp thereto can then be tightened around the pipe. In use in corners or close to walls the band is first slipped around the pipe, and then its ends are clamped under the plates 11, as explained above, after which by means of the thumb-screw 8 the members are brought together and the band tightened. In this respect the device is superior to those in which the ends of the band are riveted or otherwise firmly fixed to the clamp members and with which accordingly bands of different lengths cannot be easily substituted.

My invention may be used whenever it is desired to draw the ends of a band or strap together around an object of any size.

What I claim as new, and desire to secure by Letters Patent, is—

The combination with a band, of angular clamp members having faced flanges and a screw extending between the flanges, a detachable plate under each member, and a band the ends of which are bent over the inner edge of the plates and clamped between the plates and said members.

In testimony whereof I affix my signature in presence of two witnesses.

JOHN WINSESLAUS MARSHALL.

Witnesses:
GREEN MAJORS,
W. V. LAWLOR.